(12) United States Patent
Du et al.

(10) Patent No.: US 7,493,205 B2
(45) Date of Patent: Feb. 17, 2009

(54) BRAKE CONTROL SYSTEM FOR AN ELECTRIC DRIVE VEHICLE

(75) Inventors: Hongliu Du, Dunlap, IL (US); Saurabh Pandey, Dunlap, IL (US); Thomas M. Sopko, East Peoria, IL (US); Eric D. Stemler, Peoria, IL (US); Michael J. Barngrover, Peoria, IL (US); Brian D. Kuras, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 701 days.

(21) Appl. No.: 10/869,067

(22) Filed: Jun. 17, 2004

(65) Prior Publication Data

US 2005/0283299 A1  Dec. 22, 2005

(51) Int. Cl.
*G06F 17/00* (2006.01)
(52) U.S. Cl. .................................. 701/70; 701/22
(58) Field of Classification Search .................. 701/22, 701/70, 78, 84; 303/112, 125, 167
See application file for complete search history.

(56) References Cited

U.S. PATENT DOCUMENTS

| 6,551,212 B2 | 4/2003 | Skinner et al. ................. 477/73 |
| 6,816,768 B2 * | 11/2004 | Tamura et al. ................. 701/70 |
| 6,986,727 B2 | 1/2006 | Kuras et al. |
| 7,001,306 B2 * | 2/2006 | Suzuki ......................... 477/4 |

* cited by examiner

*Primary Examiner*—Yonel Beaulieu
(74) *Attorney, Agent, or Firm*—Finnegan, Henderson, Farabow, Garrett & Dunner

(57) ABSTRACT

A method is provided for controlling braking in a vehicle having a motor and a brake. The method includes sensing an actual operating parameter of the motor and receiving a desired operating parameter of the motor. The motor is controlled based on the actual operating parameter and the desired operating parameter of the motor. The brake is controlled based on the actual operating parameter and the desired operating parameter of the motor and an output from the motor control.

28 Claims, 5 Drawing Sheets

BRAKE CONTROL SYSTEM FOR AN ELECTRIC DRIVE VEHICLE

TECHNICAL FIELD

The present disclosure is directed to a system and method for controlling braking in a vehicle. More particularly, the disclosure relates to a system and method for controlling braking in an electric drive vehicle.

BACKGROUND

In an earth-moving machine or vehicle, such as an excavator or a loader, brakes perform important functions. Brakes are used for power management in a vehicle, including an electric drive vehicle. Typically, an electric drive vehicle has an electric motor that propels the vehicle and a brake that slows down the vehicle. By engaging the brake, the vehicle can slow down quickly, for example, to avoid an obstacle or change its moving direction. Thus, earth-moving vehicles need a brake for safety as well as their operating efficiency.

Under certain operating conditions, the vehicle is operated in a retarding or regenerating mode. Typically, retardation or regeneration occurs when the vehicle slows down from its present speed or the vehicle is pulled due to the gravity. The vehicle may experience the retarding mode, for example, when it goes down a steep hill. In such instances, the vehicle needs to dissipate energy to slow down or maintain its speed. If the vehicle does not dissipate or absorb energy when going down a steep slope, then the vehicle simply accelerate to faster and faster speeds. Similarly, the vehicle needs to dissipate or absorb energy to slow down.

In the retarding mode, the brake is often used to dissipate extra energy or power for better vehicle performance and safety. While a brake is an important part of any earth-moving vehicle, it should not unnecessarily interfere with the vehicle performance. For example, the brake control should not interfere with a motor speed control before the motor power limitation is reached. Also, brake control should provide stability to the operation of the vehicle.

Some attempts have been made to provide such braking control. For example, U.S. Pat. No. 6,551,212 discloses a decelerator system for a work machine. The deceleration system has a machine control device including an engine control, a transmission control, and a brake control. The machine control device receives an engine control signal, a transmission control signal, and a brake control signal. While the decelerator system disclosed in U.S. Pat. No. 6,551,212 provides a good system to decelerate a vehicle, a brake control system that provides automatic, integrated control of the motor and brake is desired. It is further desirable to provide an automatic brake control system that has more robust stability and does not sacrifice vehicle performance. It is also desirable to provide an integrated motor/brake control system that can handle system uncertainties with excellent stabilities.

Thus, the present brake control system is directed to solving one or more of the shortcomings associated with prior art designs and providing a braking control system with more stability and less interference with the vehicle performance.

SUMMARY OF THE INVENTION

In one aspect, a method is provided for controlling braking in a vehicle having a motor and a brake. The method includes sensing an actual operating parameter of the motor and receiving a desired operating parameter of the motor. The motor is controlled based on the actual operating parameter and the desired operating parameter of the motor. The brake is controlled based on the actual operating parameter and the desired operating parameter of the motor and an output from the motor control.

In another aspect, a system is provided for controlling braking in a vehicle having a motor and a brake. The system includes a motor operating parameter sensor and an operator input unit. A control unit is coupled to the motor operating parameter sensor and the operator input unit. The control unit includes a motor controller configured to determine a motor control output to control the motor based on signals from the motor operating parameter sensor and the operator input unit. A brake controller is coupled to the motor controller, the motor operating parameter sensor, and the operator input unit. The brake controller is configured to determine a brake control output to control the brake based on the signals from the motor operating parameter sensor, the operator input unit, and the motor control output.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
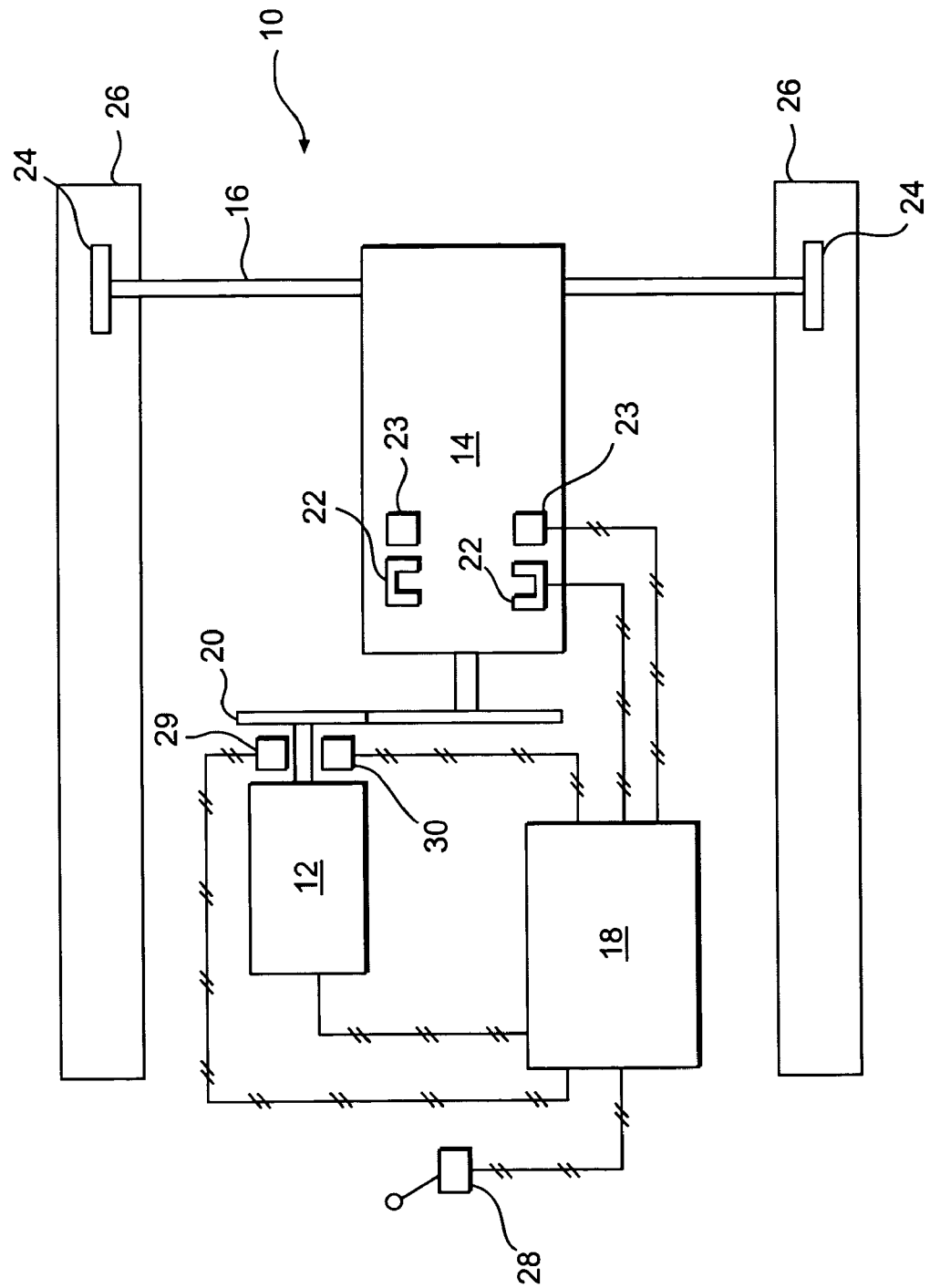
FIG. 1 is a schematic representation of an electric drive vehicle with a brake control system according to one exemplary embodiment.

FIG. 1 shows an electric drive vehicle with a brake control system according to one exemplary embodiment. An electric drive vehicle 10 includes an electric motor 12, a transmission unit 14 coupled to the motor 12, a drive train 16 coupled to the transmission unit 14, and a control unit 18. The electric motor 12 is coupled to the transmission unit 14 via a gear reduction unit 20. In the transmission unit, there are brakes 22 and transmission gears (not shown in the figure). The transmission unit 14 is coupled to a pair of sprockets 24 via the drive train 16, and the sprockets 24 are connected to driving tracks 26 to drive them.

The brakes 22 are attached to shafts in the transmission unit 14 to provide a retarding torque for the vehicle. Each of the brakes 22 is controlled by a hydraulic pressure valve 23, which is controlled by the control unit 18 (a connection to only one pair is shown in the figure). In this embodiment, a signal, such as an electric current, is sent from the control unit 18 to the valve 23. The valves 23 allow the brakes 23 to provide control pressure corresponding to the signal. The pressure control valves 23 are controlled by an electric current that can be regulated by the control unit 18. The relationship between the valve control current and the control pressure of the brakes 22 may be linearly or nonlinearly mapped depending on dynamic features of the valves 23. In most cases, if the pressure control valve 23 is a linear system, a first order transfer function is adequate to represent the mapping between the control current input and the control pressure output.

The retarding torque is generated in proportion to the friction between brake disks. The friction and the brake control pressure are assumed to be in either a linear or nonlinear relationship, and the brake control pressure can be assumed to control the retarding torque that the brakes 22 produce.

The control unit 18 is coupled to an operator input unit 28 and a motor operating parameter sensor 30. In one embodiment, the operator input unit 28 may be a lever that an operator of the vehicle moves to drive the vehicle, and the motor operating parameter sensor 30 may be a motor speed sensor. The motor speed sensor 30 may be a transducer that can measure the rotational speed of the motor 12, but any other sensor that is known for measuring motor speed may be used.

In addition to the motor speed sensor 30, the vehicle 10 may include a motor torque sensor 29 for measuring a torque of the motor 12. While the motor torque sensor 29 is not described here in detail, it can be any type of sensor that is known for sensing a motor torque. For example, the motor torque sensor 29 may be a motor control current sensor. By measuring the motor control current, the motor toque may be readily obtained.

In one embodiment, the brake control system should only be activated when the motor 12 is in a retarding mode. The control unit 18 may determine whether the motor 12 is operating in the retarding mode. The motor is in the retarding mode, for example, when a multiplication value of the sensed motor speed and the sensed motor toque is less than zero.

Also, the brake control system should not interfere with the normal operation of the motor 12. When the motor power or torque is below a motor torque limit at the sensed motor speed, the system should not be activated. Typically, the motor power limit value is decided based on a particular motor. Thus, a different motor may have a different motor power limit value at a particular motor speed.

Figure 2:
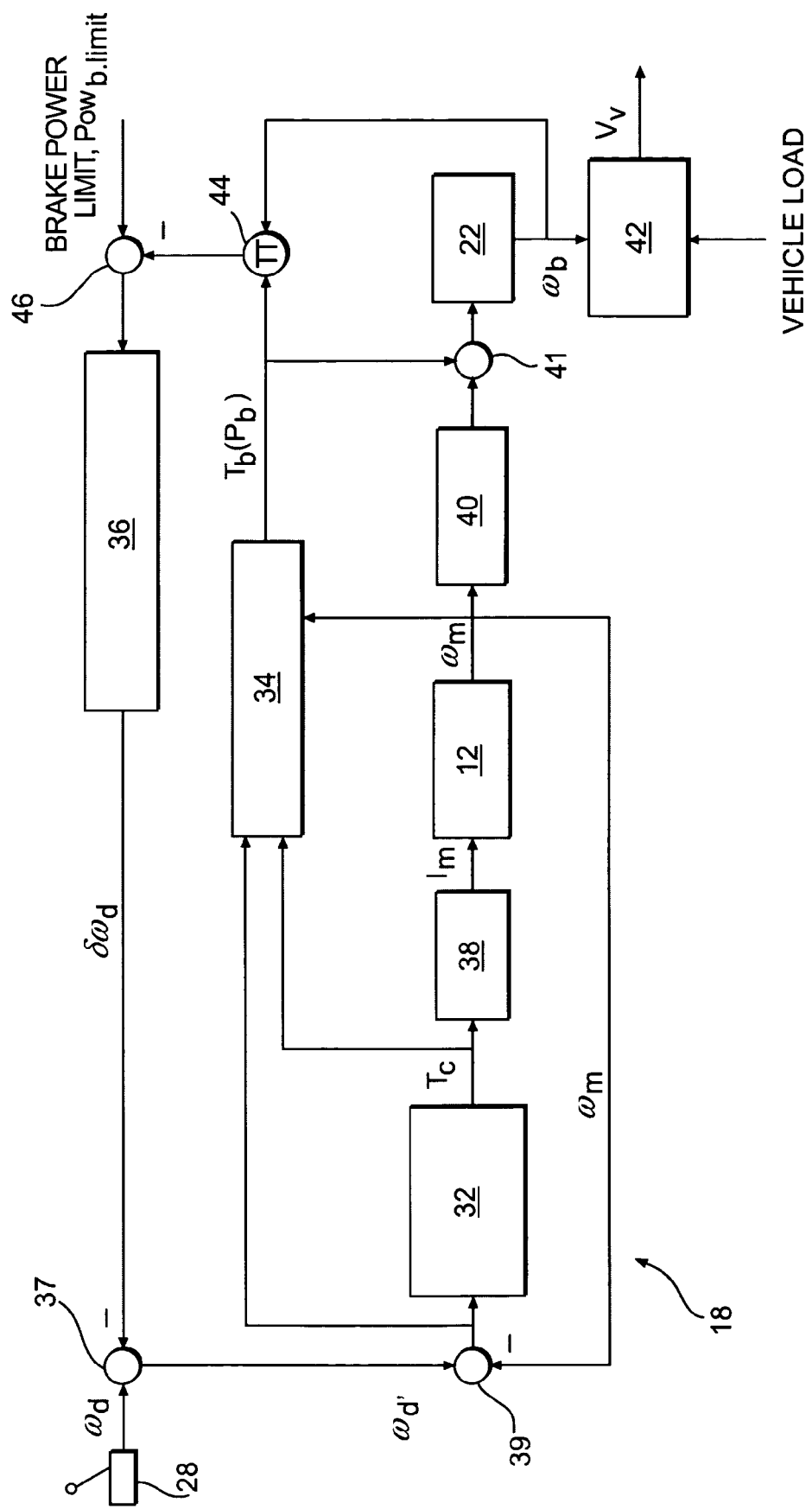
FIG. 2 is a schematic representation of the brake control system shown in FIG. 1.

As illustrated in FIG. 2, the control unit 18 includes a motor controller 32 coupled to the operator input unit 28. The motor controller 32 is configured to determine a motor control output to control the motor 12. The control unit 18 also has a brake controller 34 coupled to the motor controller 32 and the operator input unit 28. The brake controller 34 is configured to determine a brake control output to control the brakes 22.

The operator of the vehicle operates the operator input unit 28 and sends a desired motor speed signal, $\omega_d$. The motor operating parameter sensor 30 is a motor speed sensor (not shown in the figure) that senses an actual motor speed and sends a motor speed signal, $\omega_m$.

In the embodiment shown in FIG. 2, the control unit 18 also has a brake power controller 36, the function of which will be described later in detail. The brake power controller 36 outputs a motor speed modification signal, $\delta\omega_d$, based on a brake power limit. At a modifier 37, the desired motor speed signal $\omega_d$ from the operator input unit 28 is modified by the motor speed modification signal $\delta\omega_d$ from the brake power controller 36. In this embodiment, the motor speed modification signal $\delta\omega_d$ is subtracted from the desired motor speed signal $\omega_d$ to produce a modified motor speed signal, $\omega_d'$, which is sent to a modifier 39. At the modifier 39, the modified motor speed signal $\omega_d'$ is further modified by the motor speed signal $\omega_m$. In FIG. 2, the modifier 39 subtracts the motor speed signal $\omega_m$ from the modified motor speed signal $\omega_d'$, and the modified value, which is the value of $\omega_d'-\omega_m$, is sent to the motor controller 32. The modified value is a difference between the modified motor speed signal $\omega_d'$ and the motor speed signal $\omega_m$.

The motor controller 32 determines a motor control torque, $T_c$, based on the modified value sent from the modifier 39. While the motor controller 32 is a proportional-integral-derivative (PID) controller in this embodiment, it can be any other type of controller that is suitable to determine the motor control torque $T_c$ from the modified value.

The motor control torque $T_c$ from the motor controller 32 is sent to the motor torque-current converter 38. The motor torque-current converter 38 may include an equation or a map that defines a torque-current relationship of the motor 12 and determines a motor control current, $I_m$, from the motor control torque $T_c$. The torque-current relationship of the motor 12 may be linear or nonlinear. The relationship of a particular motor may be empirically determined by testing the motor.

Once the converter 38 determines the motor control current $I_m$ corresponding to the motor control torque, the motor control current is forwarded to the motor 12. In response, the motor 12 provides the motor speed corresponding to the motor control current $I_m$.

As shown in FIG. 2, the motor speed signal $\omega_m$ is then fed back to the modifier 39 to be subtracted from the modified motor speed signal $\omega_d'$. As a result, the control unit 18 provides a closed-loop control of the motor speed. Also, the motor speed is transmitted to a motor-brake (upper) part 40 of the transmission unit 14, and the upper transmission part 40 provides a signal to a modifier 41.

In the exemplary embodiment of FIG. 2, the difference between the modified motor speed signal $\omega_d'$ and the motor speed signal $\omega_m$ is also sent from the modifier 39 to the brake controller 34. In addition to the value of $\omega_d'-\omega_m$, the brake controller 34 receives the motor control torque $T_c$ from the motor controller 32 and the motor speed signal $\omega_m$ from the motor 12. Based on the $\omega_d'-\omega_m$ value, the motor control torque $T_c$, and the motor speed signal $\omega_m$, the brake controller 34 determines and outputs a brake control torque, $T_b$, in the function of brake control pressure, $P_b$. In another embodiment, the brake controller 34 may output the brake control pressure $P_b$ instead of the brake control torque $T_b$.

The brake control torque $T_b$ from the brake control 34 is forwarded to the modifier 41. In this embodiment, the brake control torque $T_b$ is modified by adding the output from the upper transmission part 40 at the modifier 41. The added value is then sent to the brakes 22 via brake pressure valves so that the corresponding brake pressure is applied by the brakes 22 to retard the vehicle. As a result of the applied brake pressure, the disk of the brakes 22 rotate at a rotational speed of $\omega_b$.

The brake rotational speed $\omega_b$ is transmitted to a brake-sprocket (lower) part 42 of the transmission unit 14. Once various vehicle loads that the vehicle 10 is exposed to during its operation are taken into account, the velocity, $V_v$, of the vehicle 10 is output from the lower transmission part 42.

In this exemplary embodiment, the brake rotational speed $\omega_b$ is also transmitted to a multiplier 44. At the multiplier 44, the brake rotational speed $\omega_b$ is multiplied by the brake control torque $T_b$ from the brake controller 34. As a result of the multiplication ($T_b*\omega_b$), a brake power is obtained and sent to a modifier 46. At the modifier 46, this brake power output from the multiplier 44 is subtracted from a brake power limit, $Pow_{b,lim}$. The brake power limit $Pow_{b,lim}$ should be set at the point which the power dissipated by the brakes exceeds their limit. When the absolute value of $T_b*\omega_b$ is determined to have exceeded the brake power limit, the difference between the absolute value of $T_b*\omega_b$ and the brake power limit is determined at the brake power controller 36.

The brake power controller 36 determines a value of the motor speed modification signal $\delta_{107_d}$ based on the difference between the value of $T_b*\omega_b$ and the brake power limit. The brake power controller 36 may be a PID controller or any other controller known to one skilled in the art to be suitable to determine the motor speed modification signal $\delta\omega_d$. In the embodiment shown in FIG. 2, the motor controller 32 and the brake controller 34 perform automatic braking control of the vehicle 10 in a closed-loop manner.

Figure 3:
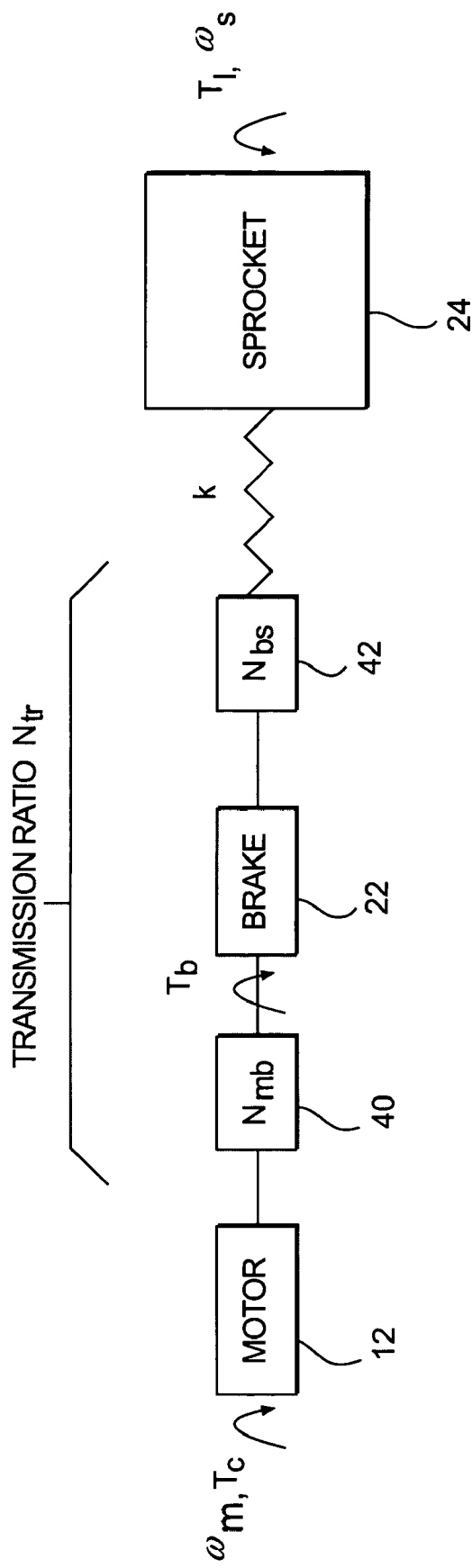
FIG. 3 is a simplified schematic representation of a part of the brake control system of FIG. 2.

FIG. 3 shows a simplified representation of a part of the control unit 18 described in FIG. 2. In FIG. 3, $\omega_s$, is the rotational speed of the sprockets 24, and $N_{tr}$ is the transmission ratio of the transmission unit. Also, $T_1$ represents the vehicle load exerted on the sprockets 24, and a spring rate, k, represents the stiffness between the motor 12 and the sprockets 24. $T_c$ and $T_b$ are the control torques for the electric motor 12 and the brakes 22, respectively. For the purpose of the analysis, the inertia of the components in the transmission unit can be ignored. However, generally speaking, the actual sprocket rotational speed $\omega_s$ will be different from the one calculated under the above assumption due to the finite stiffness between the motor 12 and the sprockets 24, i.e., $\omega_m/N_{tr} - \omega_s \neq 0$. The transmission ratio can be expressed as $N_{tr}=N_{mb}*N_{bs}=(\omega_m/\omega_b)*(\omega_b/\omega_s)$.

By Newton's law, $T_c - T_{bm}/N_{mb} = J_m\dot{\omega}_m + c_m\omega_m$ $T_b + T_{bm} = k/N_{bs}\int(\omega_m/N_{tr} - \omega_s)dt$, where the transmission inertia is neglected.

$-T_1 = J_v\dot{\omega}_s + c_s\omega_s + k\int(\omega_s - \omega_m/N_{tr})dt$

Figure 4:
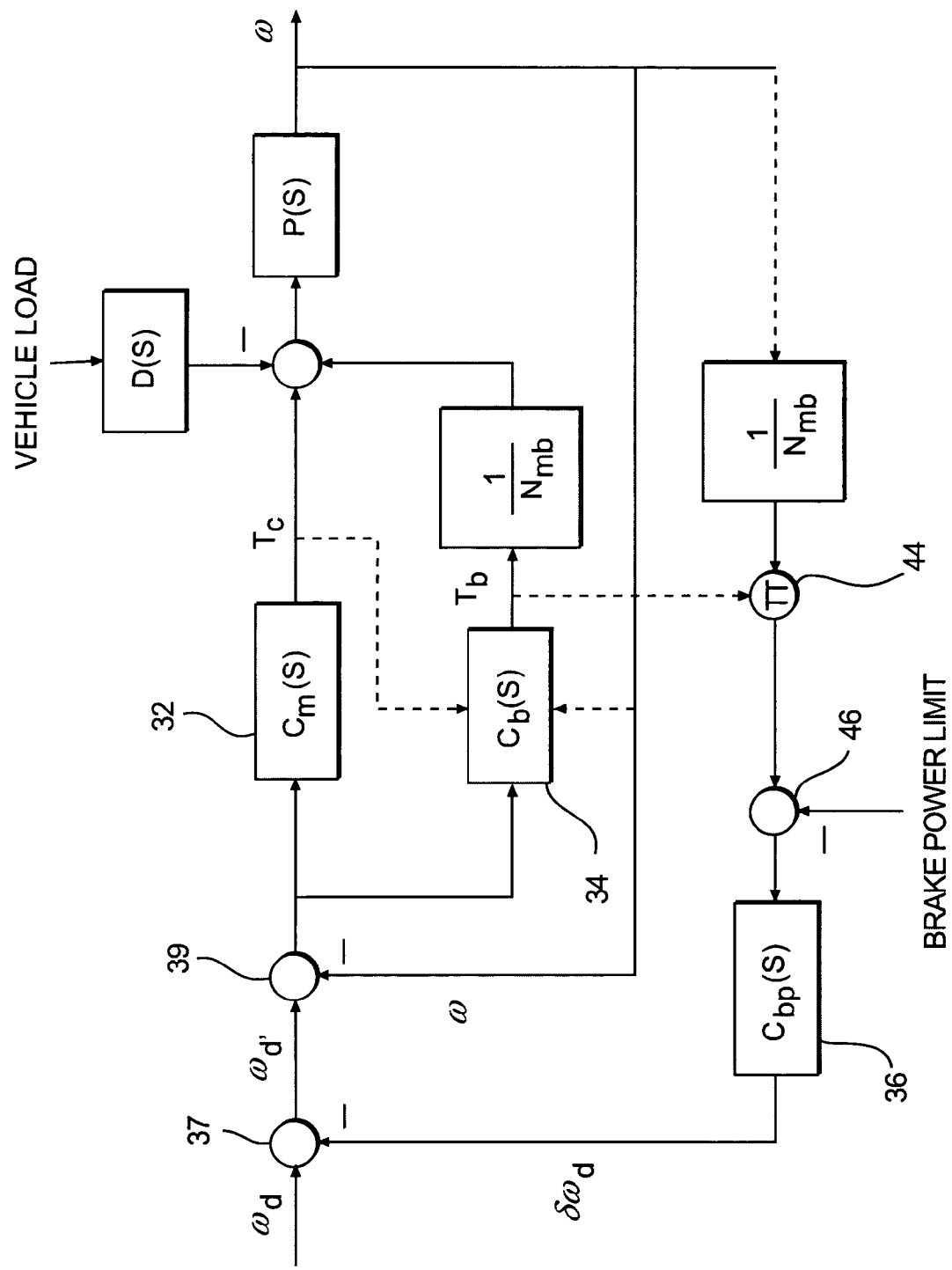
FIG. 4 is a schematic representation of a control logic of the brake control system of FIG. 2.

By Laplace transform, assuming zero initial conditions for all the integral terms, we have $T_c(s) - T_{bm}(s)/N_{mb} = (J_m s + c_m)\omega_m(s)$ $T_b(s) + T_{bm}(s) = k/sN_{bs}[\omega_m(s)/N_{tr} - \omega_s(s)]$ $-T_1(s) = (J_v s + c_s)\omega_s(s) + k/s[\omega_s(s) - \omega_m(s)/N_{tr}]$ Further, $\omega_m(s) = \{N_{tr}^2(J_v s^2 + c_s s + k)[T_b(s)/N_{mb} + T_c(s)] - kN_{tr}T_1(s)\}/\{J_m N_{tr}^2 J_v s^3 + N_{tr}^2(J_m c_s + J_v c_m)s^2 + (kJ_m N_{tr}^2 + kJ_v + N_{tr}^2 c_m c_s)s + k(c_s + N_{tr}^2 c_m)^2\}$ Then the control logic of the brake control system can be illustrated as in FIG. 4. FIG. 4 illustrates the control logic of the control unit 18 having the brake power controller 36. When possible, the same reference numerals have been used in FIG. 4 for the elements described in FIG. 2. In FIG. 4, $P(s) = N_{tr}^2(J_v s^2 + c_s s + k)/\{J_m N_{tr}^2 J_v s^3 + N_{tr}^2(J_m c_s + J_v c_m)s^2 + (kJ_m N_{tr}^2 + kJ_v + N_{tr}^2 c_m c_s)s + k(c_s + N_{tr}^2 c_m)^2\}$ $D(s) = k/[N_{tr}(J_v s^2 + c_s s + k)]$ Based on the above-described analysis and FIG. 4, a controller stabilizing the motor speed control in a closed-loop control manner can also stabilize the brake control in a closed-loop control manner with attenuation of $1/N_{mb}$. Thus, controlling the motor speed by the brake controller 34 should have the same function as controlling the motor speed by the motor speed controller 32 when the motor 12 is operating under its retarding mode.

In the embodiment in FIG. 4, the control unit 18 has three control loops. As a result, the brake control system of the control unit 18 may become nonlinear. Two approaches may be used to address the nonlinearity.

Figure 5:
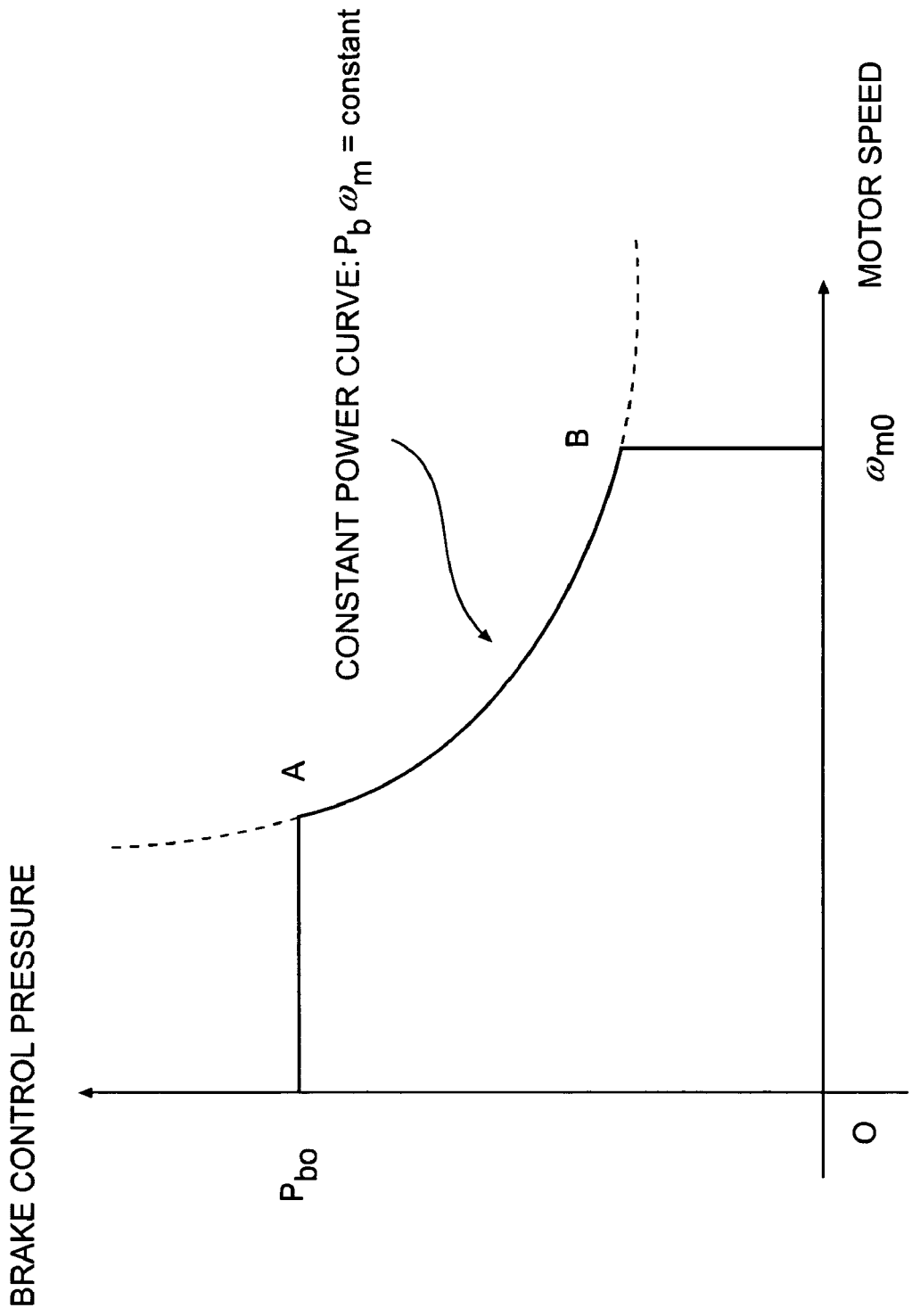
FIG. 5 is a graph illustrating a relationship between a motor speed and a brake control pressure according to one exemplary embodiment.

A relationship between the motor speed and the brake control pressure is plotted in FIG. 5. As shown in FIG. 5, the vehicle may be operated under two conditions. In one case, the brakes are normally operated within the envelope O-$P_{bo}$-A-B-$\omega_{mo}$, in which case the brake power is less than the brake limit. In the other case, the brake is operated along the curve A-B, where $P_{bo}$ and $\omega_{mo}$ represent the maximum control pressure and the maximum motor speed, respectively. In this case, the brakes are operated under constant power dissipation.

When the desired motor speed is $\omega_d(t)$ and the power limit on the brakes is $W_1$, the modified motor speed signal $\omega_d'$ is determined as:

$\omega_d' = \omega_d(t)$, if $P_b\omega_m < k_w W_1$ $\omega_d' = k_w W_1/P_b$, if $P_b\omega_m \geq k_w W_1$, where $k_w$ is a constant related to the brake-motor transmission ratio and other parameters. In one embodiment, a low-pass filter or a boundary control may be added to prevent the control system from chattering.

In the other approach, the desired motor speed $\omega_d$ may be modified by adding $\delta\omega_d$, as illustrated in FIG. 4. Therefore, the modified motor speed signal $\omega_d'$ is expressed as follows:

$\omega_d' = \omega_d - \delta\omega_d = \omega_d - f(k_w W_1 - P_b\omega_m, t)$, where $f(,)$ is a globally bounded dynamic mapping depending on the error of the brake power. Thus, $\delta\omega_d = 0$, if $P_b\omega_m < k_w W_1$ $\delta\omega_d = k_{bpp}(k_w W_1 - P_b\omega_m) + \int(k_w W_1 - P_b\omega_m)dt$, if $P_b\omega_m \geq k_w W_1$

INDUSTRIAL APPLICABILITY

Referring to FIG. 1, the vehicle 10 with the brake control system may determine whether the control system should be activated based on two conditions. First, the control system determines whether the motor 12 is in a retarding mode by sensing the motor speed $\omega_m$ and the motor control torque $T_c$ at the motor speed sensor 30 and the motor torque sensor 29, respectively. When the multiplied value of the motor speed $\omega_m$ and the motor control torque $T_c$ is less than zero, the motor 12 is determined to be working in the retarding mode.

Second, the control system senses the motor control toque $T_c$ to see if it is beyond the motor torque limit of the motor 12 at the motor speed $\omega_m$. When the motor 12 is operating in the retarding mode and the motor control torque exceeds the motor torque limit at the motor speed, the brake control system may be activated. By providing these two conditions for activation, the brake control should not interfere with the motor speed control within its normal operation range.

Once the brake control is activated, it provides automatic, integrated control over the motor and the brakes according to the operation of the one embodiment described in the above section.

The automatic vehicle brake control are activated under the motor retarding mode with a motor power limit. Also, in one embodiment, the brake control provides a stable, closed-loop control scheme to provide a certain brake control pressure for regulating the vehicle speed to track its desired trajectory within the brake power limit.

It will be apparent to those skilled in the art that various modifications and variations can be made in the disclosed system and method without departing from the scope or spirit of the invention. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method for controlling braking in a vehicle having a motor and a brake, comprising:
   determining an operating mode of the motor from a motor speed and a motor torque;
   sensing an actual operating parameter of the motor;
   receiving a desired operating parameter of the motor;
   controlling the motor based on the actual operating parameter and the desired operating parameter of the motor if the determined operating mode of the motor is a retarding mode; and
   controlling the brake based on the actual parameter and the desired parameter of the motor and an output from the motor control if the determined operating mode of the motor is the retarding mode.

2. The method of claim 1, wherein the actual operating parameter of the motor is a motor speed.

3. The method of claim 1, wherein the desired operating parameter of the motor is a desired motor speed.

4. The method of claim 1, further including determining whether a motor torque is more than a torque limit of the motor.

5. The method of claim 4, wherein the motor and the brake are controlled when the motor torque is more than the torque limit of the motor.

6. The method of claim 1, wherein the motor is controlled by determining a motor control torque.

7. The method of claim 1, wherein the motor is controlled by a proportional-integral-derivative control.

8. The method of claim 1, wherein the motor is controlled in a closed-loop manner.

9. The method of claim 1, wherein the brake is controlled by determining a brake control torque.

10. The method of claim 9, wherein the brake control torque is determined from a motor speed, a desired motor speed, and a motor control torque.

11. The method of claim 1, wherein the brake is controlled in a closed-loop manner.

12. The method of claim 1, further including comparing a brake power with a brake power limit and modifying the desired operating parameter of the motor based on the comparison.

13. The method of claim 12, wherein the desired operating parameter of the motor is modified in a closed-loop manner.

14. The method of claim 1, wherein the motor and the brake are automatically controlled.

15. A system for controlling braking in a vehicle having a motor and a brake, comprising:
   a motor operating parameter sensor;
   an operator input unit; and
   a control unit coupled to the motor operating parameter sensor and the operator input unit, the control unit being configured to determine whether the motor is in a retarding mode based on a motor speed and a motor torque, the control unit including:
   a motor controller configured to determine a motor control output to control the motor based on signals from the motor operating parameter sensor and the operator input unit if the determined operating mode of the motor is the retarding mode; and
   a brake controller coupled to the motor controller, the motor operating parameter sensor, and the operator input unit, the brake controller being configured to determine a brake control output to control the brake based on the signals from the motor operating parameter sensor, the operator input unit, and the motor control output if the determined operating mode of the motor is the retarding mode.

16. The system of claim 15, wherein the motor operating parameter sensor senses a motor speed.

17. The system of claim 15, wherein the operator input unit provides a desired motor speed.

18. The system of claim 15, wherein the control unit determines whether a motor torque is more than a torque limit of the motor.

19. The system of claim 18, wherein the motor and the brake are controlled when the motor torque is more than the torque limit of the motor.

20. The system of claim 15, wherein the motor controller is a proportional-integral-derivative controller.

21. The system of claim 15, wherein the motor control output is a motor control torque.

22. The system of claim 15, wherein the motor controller controls the motor in a closed-loop manner.

23. The system of claim 15, wherein the brake controller output is a brake control torque.

24. The system of claim 15, wherein the brake controller controls the brake in a closed-loop manner.

25. The system of claim 15, further including a brake power controller, the brake power controller being configured to provide a modification signal based on a brake power limit for modification of the signal from the operator input unit.

26. The system of claim 25, wherein the brake power controller provides the modification signal in a closed-loop manner.

27. The system of claim 15, wherein the motor controller and the brake controller automatically control the motor and the brake.

28. A vehicle, comprising:
   a motor;
   a transmission unit coupled to the motor, the transmission unit having a brake;
   a drive train coupled to the transmission unit;
   an operator input;
   a motor operating parameter sensor;
   a control unit coupled to the operator input and the motor operating parameter sensor, the control unit being configured to determine whether the motor is in a retarding mode based on a motor speed and a motor torque, the control unit including:
   a motor controller configured to determine a motor control output to control the motor based on signals from the motor operating parameter sensor and the operator input unit if the determined operating mode of the motor is the retarding mode; and
   a brake controller coupled to the motor controller, the motor operating parameter sensor, and the operator input unit, the brake controller being configured to determine a brake control output to control the brake based on the signals from the motor operating parameter sensor, the operator input unit, and the motor control output if the determined operating mode of the motor is the retarding mode.

* * * * *